United States Patent
Williams

(10) Patent No.: US 8,605,161 B2
(45) Date of Patent: Dec. 10, 2013

(54) INTRA-FRAME OPTICAL-STABILIZATION WITH INTENTIONAL INTER-FRAME SCENE MOTION

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/418,160

(22) Filed: Mar. 12, 2012

(65) Prior Publication Data

US 2013/0235220 A1    Sep. 12, 2013

(51) Int. Cl.
*H04N 5/228* (2006.01)
(52) U.S. Cl.
USPC .................................. 348/208.99; 348/208.5
(58) Field of Classification Search
USPC ............. 348/220.1, 352, 402.1, 407.1, 413.1, 348/416.1, 431.1, 451, 452, 699, 700, 348/E7.007, E7.013, E7.014, 248, E5.08, 348/24, 25, 27, 333.03, 241, 252, 606, 607, 348/625, 208.99, 208.5–208.13
See application file for complete search history.

(56) References Cited

U.S. PATENT DOCUMENTS

| 4,054,797 A | 10/1977 | Milton et al. |
| 7,791,638 B2 | 9/2010 | McCutchen |
| 7,929,043 B2 | 4/2011 | Tsubaki et al. |
| 2008/0030586 A1* | 2/2008 | Helbing et al. ............ 348/208.4 |
| 2009/0219402 A1* | 9/2009 | Schneider ................... 348/208.7 |
| 2012/0201427 A1* | 8/2012 | Jasinski et al. ................ 382/107 |
| 2012/0242853 A1* | 9/2012 | Jasinski et al. ............. 348/222.1 |

OTHER PUBLICATIONS

William D. Rogatto, "The Infrared & Electro-Optical Systems Handbook, vol. 3, Electro-Optical Components," 1993, The Society of Photo-Optical Instrumentation Engineers and the Environmental Research Institute of Michigan, pp. 328-329.

* cited by examiner

*Primary Examiner* — Tuan Ho
*Assistant Examiner* — Chan Nguyen
(74) *Attorney, Agent, or Firm* — Eric A. Gifford

(57) ABSTRACT

In an imaging system, intentional scene motion across the image detector from frame-to-frame, and more particularly the rate of intentional scene motion is "decoupled" from smearing of the scene in the detected image by applying the intentional scene motion in the interval between frames to produce the intentional scene motion in a discrete step across the image detector from frame-to-frame. The intentional scene motion may be quantized or provided as a sub-pixel dither signal to control the sub-pixel phase frame-to-frame. In register/sum applications, this substantially eliminates misregistration of the images and may allow for super-sampling of the images onto a higher resolution grid. The ability to decouple intentional scene motion from smearing and to control the sub-pixel phase defines a new trade space that relaxes the limitations on intentional scene motion across the image detector.

23 Claims, 11 Drawing Sheets

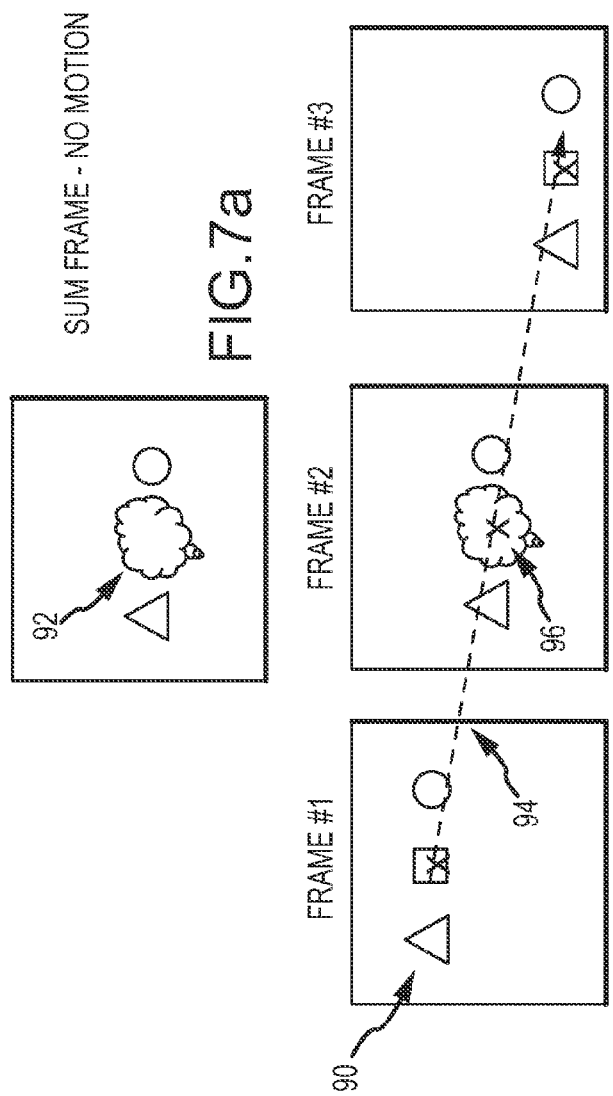
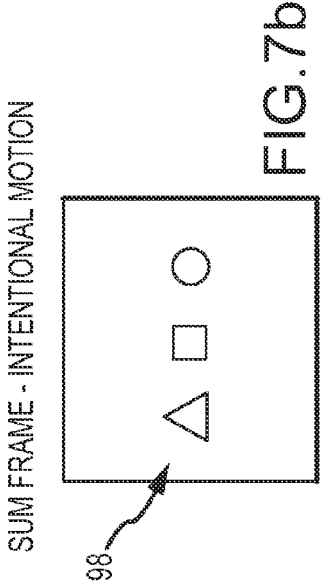
FIG.7a
FIG.7b

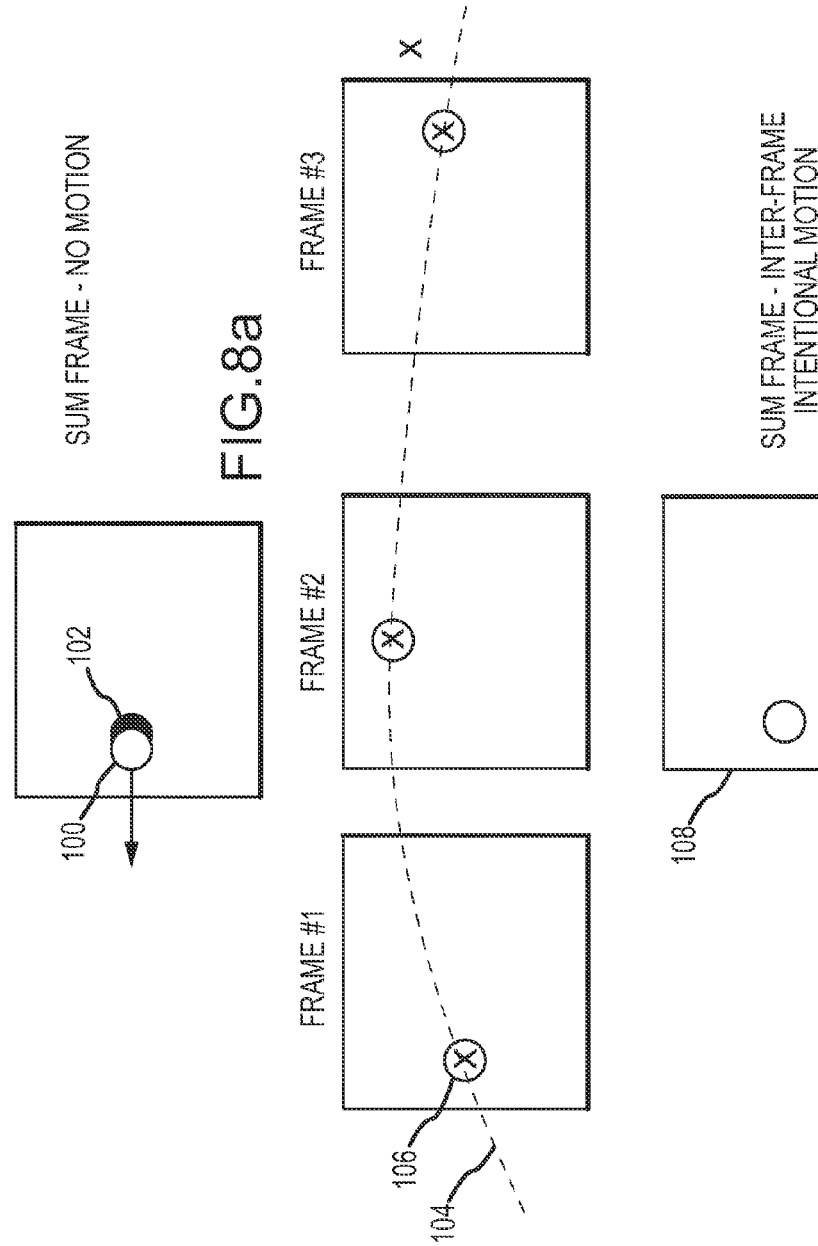

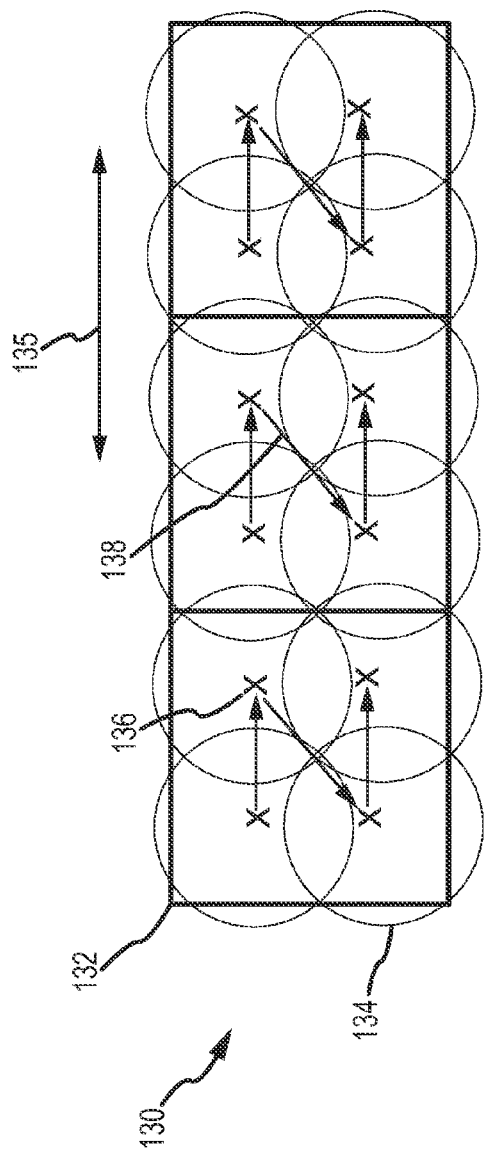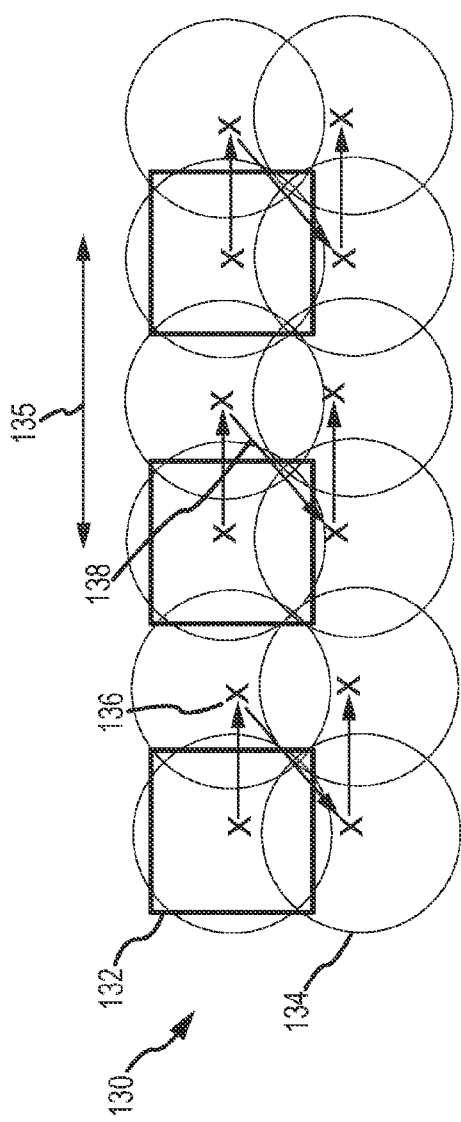

INTRA-FRAME OPTICAL-STABILIZATION WITH INTENTIONAL INTER-FRAME SCENE MOTION

BACKGROUND OF THE INVENTION

1. Field of the Invention

This invention relates to imaging systems, and more particularly to relaxing limitations on scene motion across the imager to address issues such as imaging system pointing and stabilization limitations, non-uniformity compensation (NUC), dead pixel clumps, burn-in mitigation, field-of-view (FOV) extension, super-sampling, pixel-phase induced noise in frame summing, and staying within the limits of optical stabilization actuators.

2. Description of the Related Art

Imaging systems image a field-of-view (FOV) of a scene along a line-of-sight (LOS) onto an image detector that captures images a certain frame rate. The "scene" is what the imaging system is looking at such as an object of interest in a background. It is well known and widely accepted that any motion of the scene across the image detector produces smearing of the scene in the image during the frame. Such motion and smearing are tightly coupled. The higher the rate of motion the greater the amount of smearing. The tradeoff of rate of motion vs. smearing constitutes a system level trade space.

Motion of the scene across the image detector has two components. A first motion component represents motion that the system would like to remove during frame integration. This component may include intentional motion of the imaging system across the scene (e.g. LOS scan to cover a larger area across the frame), unintentional motion of the image detector across the scene (e.g. platform jitter) and scene motion (e.g. the object of interest is moving relative to the background). A second motion component represents intentional scene motion across the imaging detector (as opposed to across the scene) that must not be removed. This component may be induced for such purposes as enabling pixel non-uniformity compensation, mitigating the effects of dead pixel clumps in the imager or the effects of burn-in such as vidicon ghosting, or for enabling effective FOV enlargement across a sequence of frames (as in step-stare, TDI, or non-TDI scanners).

The imaging system may implement optical-stabilization to remove the first motion component. The system measures the unintentional and intentional motion of the detector across the scene and subtracts the motion from the estimated scene motion to produce an actuation signal. The actuation signal drives an actuator to control LOS to cancel the first motion component. The actuator may reposition the image detector, one or more optical components of the system's optical focusing system or a gimbal on which the imaging system is mounted. Because the actuator has a limited dynamic range, it may need to be continuously re-centered to stay within actuation limits. Re-centering produces intentional motion of the scene across the detector.

Ideally, optical stabilization removes all unintentional sources of scene motion across the image detector. But it does not, in fact must not, remove the second motion component representing intentional scene motion across the imager from frame-to-frame. Therefore, in existing practice, the system designer must always balance the inherent trade-off of smearing vs. rate of intentional motion across the image detector.

In certain imaging systems the frame rate is increased to relax the motion vs. smear tradeoff, and the consequent signal-to-noise (SNR) loss is mitigated by registering and summing multiple frames, producing a sum-image having a higher SNR ratio than the individual frames. For example, when the frame rate is increased by 5× and sum-frames are produced at the previous frame rate, the single-frame smear is reduced by about a factor of five. Frame summing is sometimes done to improve SNR induced by other system limitations, such as single-frame integration time, but it is still limited by registration and smear.

Frame summing also produces another system sensitivity. The same motion that produces smear causes shifts in the sub-pixel phase of the image from frame-to-frame. Since the individual images are inherently pixelized, this produces an effective misregistration of the images to be summed, which causes the summing to increase the effective smearing. It also increases effective noise based on the non-repeatability of the smearing function (of the sub pixel phase histories) from sum frame to sum frame. In some cases, this blurring offsets much of the SNR benefit of summing multiple images together.

The "register and sum" function may be performed off of the image detector, in a computer or in dedicated logic, or may be performed on the image detector (e.g. orthogonal transform charge coupled device (CCD) or time domain integration (TDI) CCD). The advantage of performing the register and sum in the detector is a much higher frame rate (per summed frame), limiting the time over which smear occurs, and consequently the smear. But, this cannot fully eliminate the smear from intentional and necessary motion.

Conventional optical stabilization cannot fix remaining smear either, because as stated previously this would require canceling the intentional motion. For example, scanning TDI uses registered "frames" of a multi-column detector to improve performance over a single-column detector, but relies on image motion across the detector to scan the scene. Complete stabilization would cancel this motion. Thus, the designer is always left with at least one frame of smear embedded the summed frame.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for decoupling within-frame motion from any intentional scene motion across the image detector from frame-to-frame, and more particularly the rate of intentional scene motion from smearing of the scene in the detected image with each frame. The invention may also control the sub-pixel phase of the image from frame-to-frame. In register/sum applications, controlling the sub-pixel phase from frame-to-frame either substantially eliminates misregistration of the images at full-pixel resolution or allows for super-sampling of the images onto a higher resolution grid. The ability to decouple intentional scene motion from smearing and to control the sub-pixel phase from frame-to-frame defines a new trade space that relaxes the limitations on intentional scene motion across the image detector to address issues such as imaging system pointing and stabilization limitation, non-uniformity compensation (NUC), dead pixel clumps, burn-in mitigation, FOV extension, super-sampling, pixel-phase induced noise in frame summing, and staying within the limits of optical stabilization actuators.

In an embodiment in which an imaging system includes an image detector configured to capture images of a scene along a LOS in a sequence of frames, an actuator is driven during frames to control the LOS to provide optical stabilization to remove detector motion relative to the scene and is driven between frames to provide intentional scene motion in a discrete step across the detector from frame-to-frame. Intra-frame optical stabilization substantially eliminates smearing in the image caused by detector motion relative to the scene. Inter-frame intentional scene motion decouples that motion from scene capture during frames substantially eliminating smearing in the image caused by the intentional scene motion. The combination of intra-frame optical stabilization and inter-frame intentional scene motion substantially eliminates smearing within a frame.

In an embodiment, the actuator is driven continuously during the frame to cancel scene motion across the image detector and is driven in a single discrete step between frames to provide intentional scene motion in a discrete step across the image detector from one frame to the next. Driving the actuator in multiple discrete steps between frames will still produce intentional scene motion in a single discrete step across the detector from one frame to the next.

In an embodiment, the intentional scene motion across the detector is quantized to an integer multiple of a predetermined step size (e.g. a full-pixel). Driving the actuator in quantized step sizes provides control over the sub-pixel phase of the image between frames.

In an embodiment, a sequence of images are registered based on the quantized motion of the actuator and summed to form a sum image. In one case, the intentional scene motion is quantized and the images are summed at the center sub-pixel phase to provide an image at full-pixel resolution. In another case, the intentional motion is a sub-pixel dither signal; the images are mapped according to their sub-pixel phase to a higher resolution grid to form a higher resolution image. The sub-pixel dither signal could be quantized as well provided the quantization step-size is sub-pixel.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7a and 7b are diagrams illustrating the problem posed by dead pixel clumps in the image detector and mitigation of the problem using inter-frame intentional scene motion without smearing;

FIGS. 8a and 8b are diagrams illustrating the problem posed by burn-in in the image detector due to motion of a bright source across the scene and mitigation of the problem using inter-frame intentional scene motion without smearing;

FIGS. 9a through 9d are diagrams illustrating FOV extension using inter-frame intentional scene motion.

DETAILED DESCRIPTION OF THE INVENTION

In an imaging system, in accordance with the present invention intentional scene motion across the image detector, and more particularly the rate of intentional scene motion is "decoupled" from smearing of the scene in the detected image by controlling the LOS motion between frames, as opposed to during frames, to produce the intentional scene motion in a discrete step across the image detector from frame-to-frame. The intentional scene motion may be quantized or provided as a sub-pixel dither signal to control the frame-to-frame sub-pixel phase of the detected image. In register/sum applications, this may substantially eliminate misregistration of the images at full-pixel resolution or allow for super-sampling of the images onto a higher resolution grid. The ability to decouple intentional scene motion from smearing and to control the frame-to-frame sub-pixel phase violates the accepted trade space of rate vs. smearing and defines a new trade space that relaxes the limitations on intentional scene motion across the image detector to address issues such as imaging system pointing and stabilization limitation, non-uniformity compensation (NUC), dead pixel clumps, burn-in mitigation, field-of-view (FOV) extension, super-sampling, pixel-phase induced noise in frame summing, and staying within the limits of optical stabilization actuators.

These imaging systems may be analog systems such as film or more commonly digital systems such as FPAs or multi-column CCDs. The digital imaging systems may be hand-held point & shoot digital cameras or digital video cameras or platform mounted systems. The platform-mounted systems may be mounted on a pointer/tracking system or a land/sea/air/space vehicle. The imaging system may be fixedly mounted to these platforms or mounted on a gimbal that is free to rotate in one or more axes relative to the platform. The imaging system pointer/tracking system may control the LOS to track the scene. This LOS motion is relatively coarse as compared to the micro actuation performed at the level of the imaging detector both during and between frames by the invention.

Figure 1:
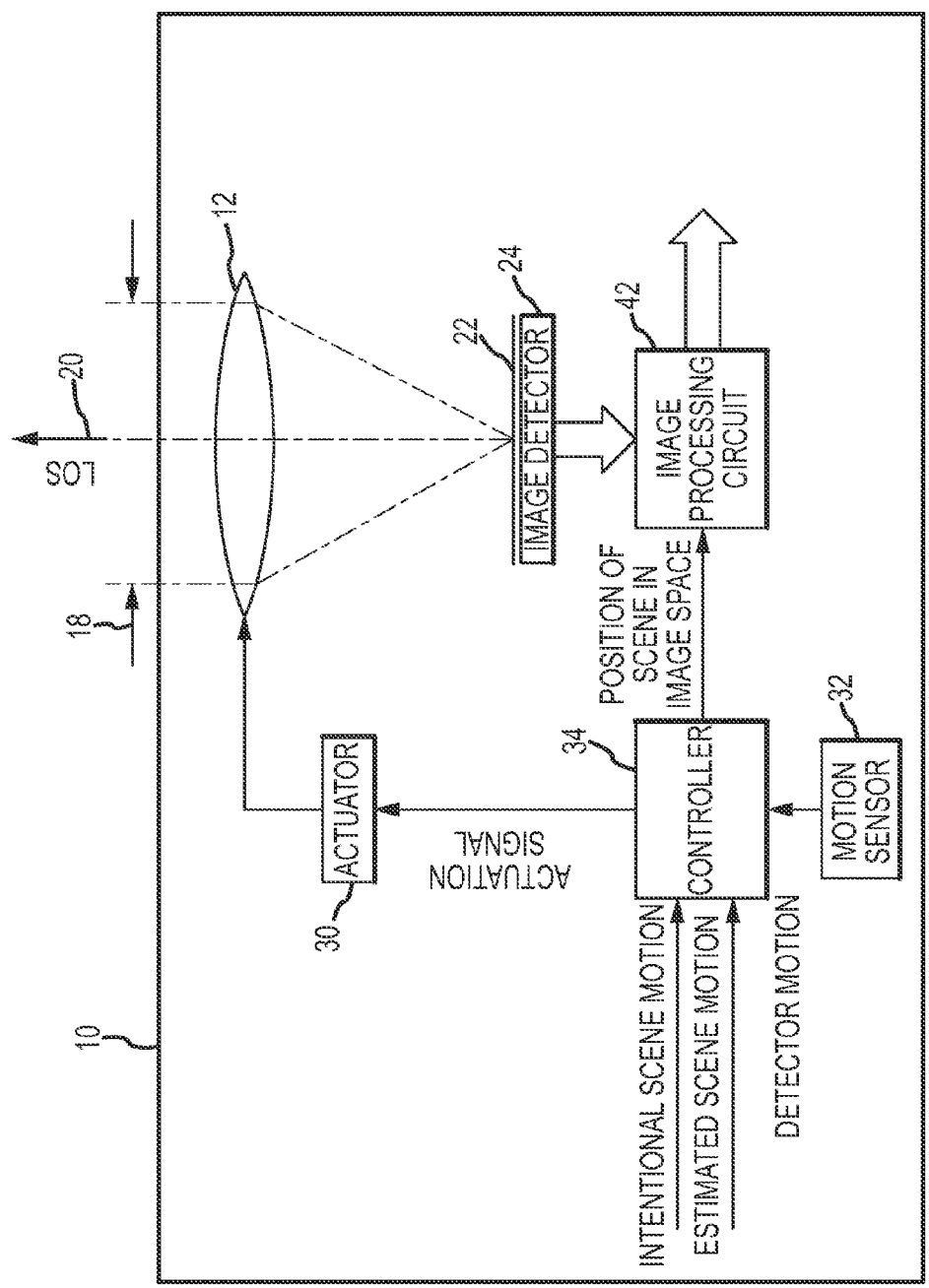
FIG. 1 is a block diagram of an optically-stabilized imaging system.
Figure 2:
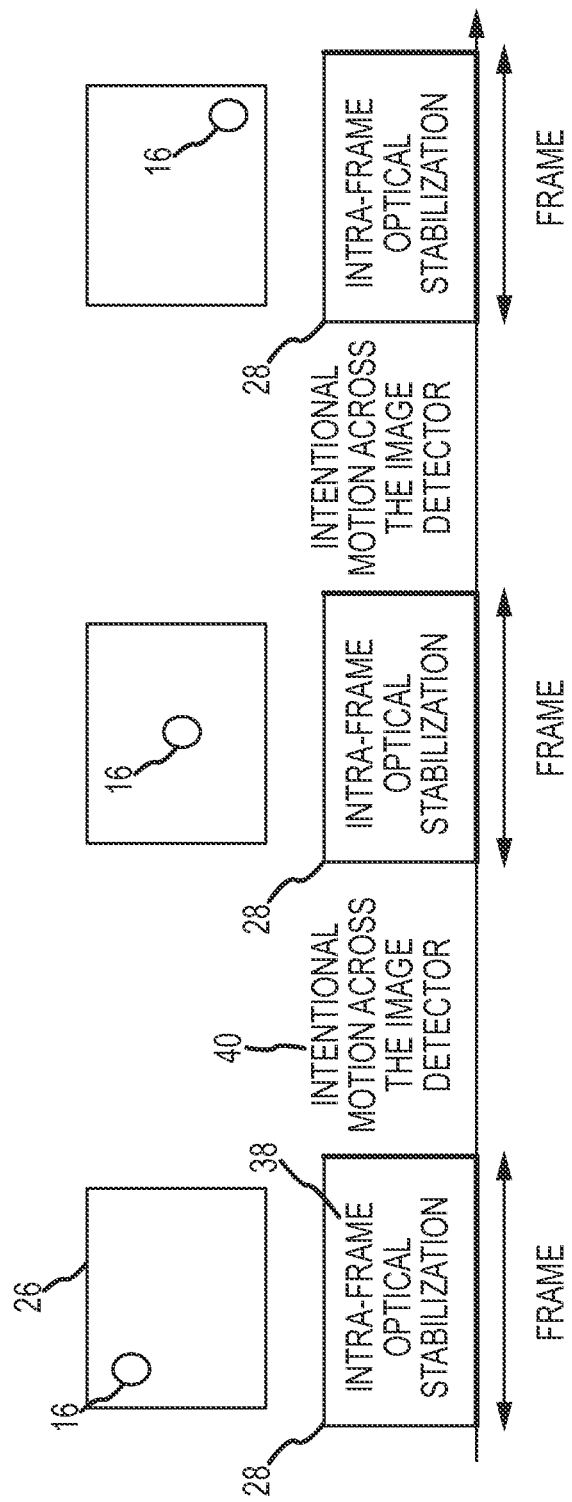
FIG. 2 is a flow diagram illustrating the steps and scene motion in detector space of intra-frame optical stabilization of a scene during frames and inter-frame intentional scene motion between frames.
Figure 3:
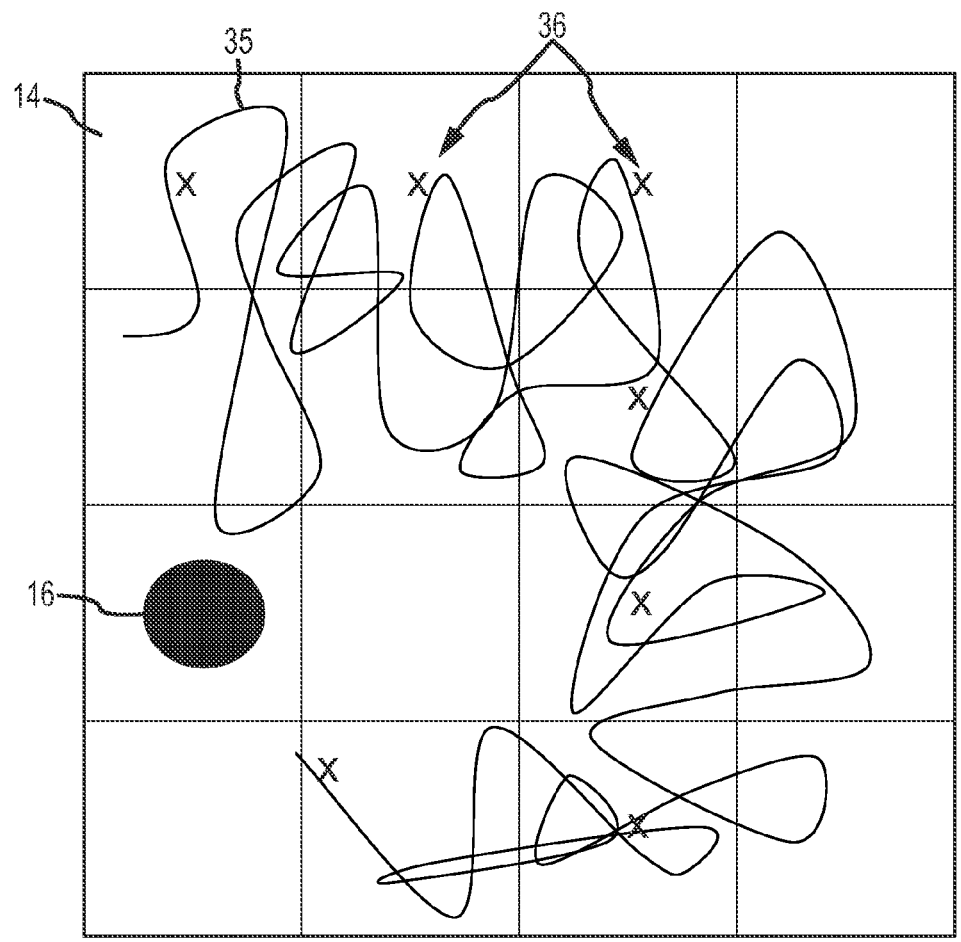
FIG. 3 is a diagram illustrating an embodiment of an actuation signal in scene space for LOS control for continuous optical stabilization during frames and discrete intentional scene motion between frames.

Referring now to FIGS. 1-3, an embodiment of an optically-stabilized imaging system 10 includes an optical system 12 for focusing an image 14 of a scene 16 within a field-of view (FOV) 18 along a LOS 20 onto a common image plane 22. An image detector 24 such as a digital FPA or multi-column CCD is substantially aligned with the common image plane to capture images 26 images in a sequence of frames 28. An actuator 30 is responsive to an actuation signal to move one or more optical elements of optical system 12 (possibly including an additional steering mirror provided for LOS control or the entire gimbaled structure) or image detector 24 to control the LOS. Actuator 30, which may comprise one or more actuators, may control the LOS to move along the X-axis, Y-axis or roll about the Z-axis or any combination thereof. A motion sensor 32 (e.g. an inertial measurement unit (IMU), or an inertial rate sensor) measures unintentional (e.g. jitter) and intentional (e.g. LOS scan) detector motion across the scene. A controller 34 receives as inputs the detector motion across the scene, an estimated scene motion and an intentional scene motion across the detector from frame-to-frame and outputs the actuation signal to drive actuator 30. The estimated scene motion may be zero (e.g. a fixed scene in the background), may be provided by an external source or may be derived from detector motion (e.g. assume detector is moving to track a moving target).

The actuation signal includes an intra-frame component 35 responsive to the camera motion relative to the scene to drive the actuator 30 during frames 28 and cancel scene motion across the image detector and substantially eliminate smearing in the image caused by camera motion relative to the scene and an inter-frame component 36 responsive to the intentional scene motion across the image detector frame-to-frame to drive the actuator 30 between frames 28 to provide intentional scene motion in a discrete step across the image detector from one frame to the next. This inter-frame motion decouples the intentional scene motion across the image detector from scene capture during frames and substantially eliminates smearing in the image caused by the intentional scene motion. The actuator(s) could receive two separate signals, one corresponding to the intra-frame component 35 and one corresponding to the inter-frame component 36.

As illustrated in FIG. 2, the actuator is driven during frames 28 to provide intra-frame optical-stabilization (step 38) to remove detector motion relative to the scene and is driven between frames 28 to provide intentional scene motion across the image detector frame-to-frame (step 40). Driving the actuator "during" frames or "intra-frame" means the actuator is driven within a time window that defines a given frame. Driving the actuator "between" frames or "inter-frame" means the actuator is driven at a point in time that lies in an interval between the end of the preceding frame and the beginning of the next frame. In some detectors integration is literally stopped during this period between frames. In others (such as typical CCD cameras) the period between frames is kept short enough compared to the frame time that the effect of any photons collected during that period is minimal. As shown in FIG. 3, scene 16 moves across image 26 from frame-to-frame in a single discrete step in response to the intentional scene motion input. Furthermore, within a frame scene 16 exhibits ideally no smearing due to the optical-stabilization and the fact that the intentional scene motion is added "between" frames rather than intra-frame.

Intra-frame component 35 and inter-frame component 36 are depicted in FIG. 3 in "scene space" relative to fixed scene 16 within the FOV. The intra-frame component 35 cancels detector motion relative to the scene so that the scene 16 remains fixed on the detector during the frame. Inter-frame component 36 produces an equal but opposite intentional scene motion when viewed in image space on the detector. In this embodiment, intra-frame component 35 drives the actuator continuously during the frame to compensate for the high-frequency detector motion relative to the scene while the inter-frame component 36 drives the actuator in a discrete step between frames to provide the desired low-frequency scene motion in discrete steps across the detector from frame-to-frame. Even if the actuator is driven in multiple steps between frames, this will appear as a single discrete step in the detected image from one frame to the next. The size of the discrete step from one frame to the next can and will change with the intentional scene motion input.

An image processing circuit 42 receives as inputs the position of the scene in image space and the images 26 for the sequence of frames 28. The position of the scene in image space allows the circuit to register the images to perform various image processing such as scene change detection from one frame to the next, resolution enhancement by mapping from individual frames to a high resolution estimate or SNR enhancement by summing the registered frames.

The performance of these types of image processing techniques can be enhanced by controlling the sub-pixel phase of the image from frame-to-frame. To control the sub-pixel phase, controller 34 quantizes the intentional scene motion input to a predetermined step size (or integer multiple thereof). This quantized intentional scene motion is embedded in the position of the scene in image space and allows the images to be accurately registered to control sub-pixel phase. In one embodiment, the intentional scene motion input is quantized to sub-pixel step sizes to effect super-sampling. The images are mapped based on the sub-pixel phases to a higher resolution grid to form a higher resolution image. In another embodiment, the intentional scene motion is quantized to full-pixel step sizes. The images are registered at the full-pixel step sizes preserving sub-pixel phase and not blurring the sum image (by misregistration of the individual images due to quantized registration).

The "register and sum" function may be performed off of the image detector, in a computer or in dedicated logic, or may be performed on the image detector (e.g. orthogonal transform charge coupled device (CCD) or time domain integration (TDI) CCD). The advantage of performing the register and sum in the detector is a much higher frame rate (per summed frame). These on-detector approaches may be used in conjunction with optical stabilization because the intentional scene motion relied on by these types of multi-column detectors to scan the FOV is provided "between" frames and thus is not removed by optical stabilization. In these on-detector approaches, the image processing circuit is part of the detector for purposes of forming the sum image.

Certain image detectors, such as standard FPAs, integrate photons over an integration time slightly less than the width of the frame. At the end of the frame, the image is read out and the integration time is reset. There is a certain reset period (e.g. "vertical blanking") between frames during which the FPA does not integrate charge. The actuator is driven between frames in this reset period in response to the intentional scene motion input.

Other types of detectors (e.g. some CCDs which transfer data into a readout region, or orthogonal transfer CCDs) may continue to integrate photons between frames, but keep the between-frame interval short enough that the contribution of those photons is minimal (e.g., the between-frame time is short enough to reduce streaking smear during transfer into the readout region of a CCD). In these cases the effective decrease in smear using the described method is roughly proportional the ratio of the between frame time to the full frame interval.

TDI scanners may be viewed as a special case of continuously integrating detector, where each sample of the multiple-column TDI detector constitutes a frame and the sum-image of registered frames (as the LOS scans across columns) constitutes what is normally considered the output image from the scanned sensor. Integration continues during the column shifts and readout, causing roughly one column of blur. This blur can be reduced using the methods described here, to stabilize the line of sight during a portion of the column-time, resetting to follow the line of sight motion during a shorter period which then constitutes the between-frame time.

In many cases, but particularly with scanned TDI orthogonal-transfer CCD detectors, there may be a much larger between-frame period that occurs between sum-frames. In the case of a uni-directional TDI scanner, this is sometimes known as the "fly back" interval, where the column scanning mechanism resets to the start of a frame. Larger intentional LOS motions may be applied during this between-frame period. But, again, even if integration continues during that time, the effect is negligible is the between-frame time is much smaller than the within frame time.

Figure 4:
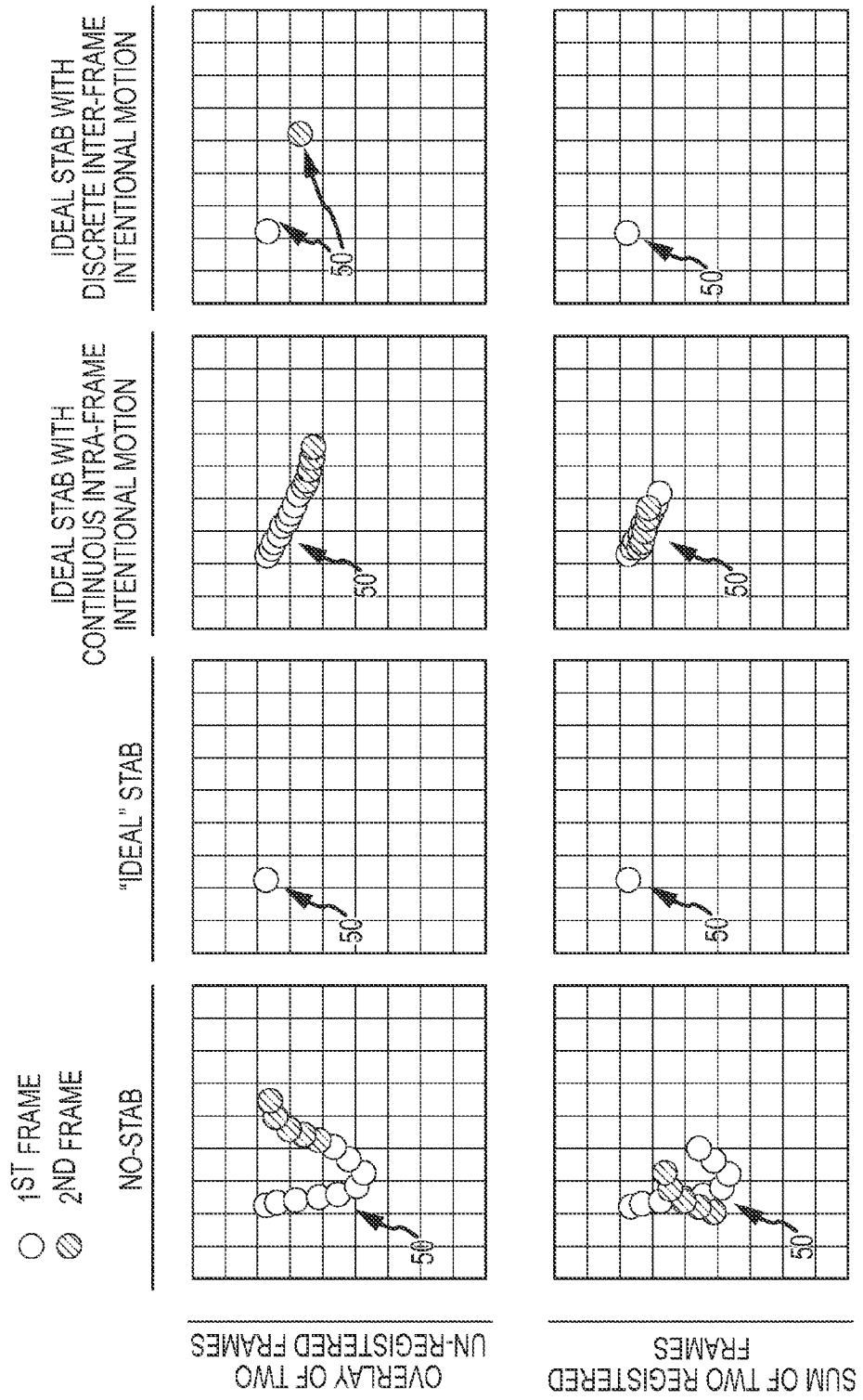
FIG. 4 is a diagram illustrating the overlay of two unregistered digital images and the sum of the two registered digital frames comparing for different techniques of incorporating intentional scene motion across the imager with optical stabilization.

Referring now to FIG. 4, the first row illustrates the results of overlaying two un-registered images that include a scene 50 (depicted as a simple circle) subjected to detector motion relative to the scene (e.g. jitter) and different cases of intentional motion and methods of compensation. With no intra-frame stabilization ("No-Stab"), the scene 50 smears across each of the $1^{st}$ and 2nd frames. Assuming no intentional motion, ideal intra-frame stabilization ("Ideal-Stab") eliminates the smear due to the detector motion relative to the scene. Ideal stabilization with continuous intra-frame intentional motion smears scene 50 across each of the $1^{st}$ and $2^{nd}$ frames. This motion may be attributable to continuous re-centering of the actuator to remain within its dynamic range or to scene motion to mitigate effects of dead pixel clumps, NUC or burn-in for example. In this case, the conventional tradeoff of rate of scene motion vs. smearing is in effect. Ideal stabilization with inter-frame intentional motion moves scene 50 from one position in the $1^{st}$ frame to another position in the $2^{nd}$ frame in a single discrete step without smearing. Consequently the rate of scene motion is decoupled from smearing.

The second row illustrates the results of summing the two registered images. The same motion that produces smear causes shifts in the sub-pixel phase of the detected image from frame-to-frame. Since the individual images are inherently pixelized, this produces an effective misregistration of the images to be summed, which causes the summing to increase the effective smearing. It also increases effective noise based on the non-repeatability of the smearing function (of the sub pixel phase histories) from sum frame to sum frame. With no stabilization, the smearing remains and the frames are aligned as well as can be given that the registration is constrained to full pixel shifts. Ideal stabilization removes the smear and provides an ideal sum image (assuming no intentional scene motion across the detector). When intentional scene motion is required, the ideal intra-frame stabilization can minimize smear but cannot remove the part attributable to intentional scene motion. The resulting sum image is smeared due to the smearing in each of the images and the misregistration of those images. The combination of ideal intra-frame stabilization with inter-frame intentional scene motion produces motion from frame-to-frame in discrete steps whose step-sizes are controlled and known. Together this removes the smear in each image and enables precise registration of the images. Proper registration is achieved by quantizing the inter-frame intentional scene motion to a pre-determined step size, shown here as a full pixel step size. Alternately, a sub-pixel dither signal can provide the intentional scene motion in order to map different frames to a higher resolution image.

Considering the results illustrated in FIG. 4, one can readily see that the normal design paradigm requiring a tradeoff of rate of intentional scene motion versus the amount of smearing has been broken and replaced with a new design paradigm that relaxes limitations on scene motion across the imager. A discrete step of the actuator, hence LOS, in the time window between frames produces discrete scene motion from one frame to the next without smearing. Extrapolating this to a sequence of multiple frames, by proper selection of the discrete steps any desired scene motion across the imager is possible. The discrete steps could be in response to system pointing errors to accelerate or stabilize the coarse LOS motion of the pointing system. The discrete steps could trace a linear, non-linear or random path at high rates across the imager to mitigation NUC, dead pixels clumps or burn-in. The discrete steps could be uniform in size and direction to provide a constant rate of linear motion across the detector for TDI CCD. The discrete steps may effectively extend the FOV of the imaging system or the image detector at a desired resolution. The discrete steps may be used to re-center the actuators to stay within the limits of the dynamic range. The discrete steps may be used to mitigate pixel-phase induced noise during frame summing or to provide super sampling to a higher resolution image.

Figure 5:
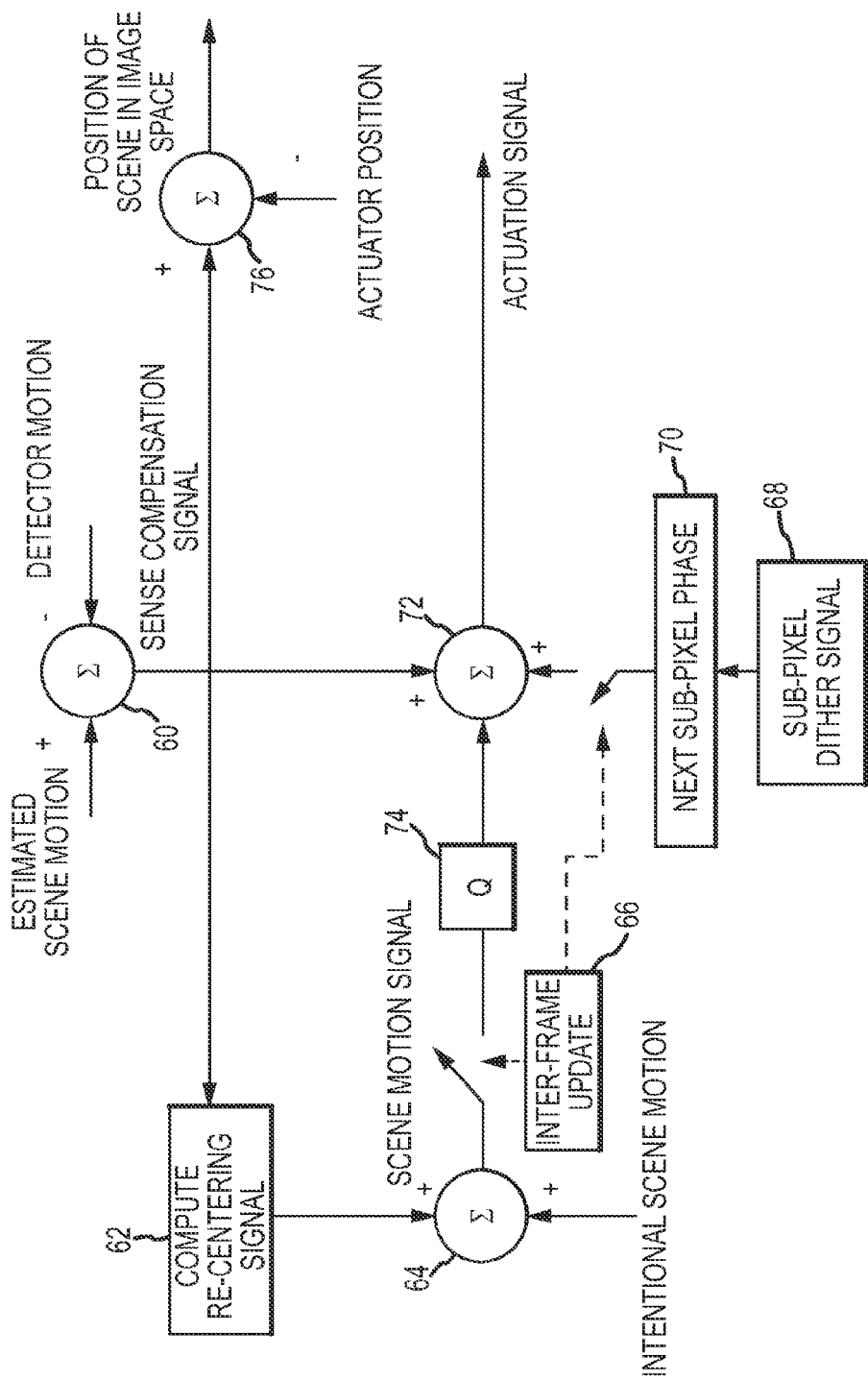
FIG. 5 is a flow diagram of an embodiment for computing an actuation signal to control LOS to implement intra-frame optical stabilization and inter-frame intentional scene motion.

As shown in FIG. 5, in an embodiment of the controller, the controller subtracts the detector motion from the estimated scene motion (step 60) to form a scene compensation signal. The scene compensation signal is output as the intra-frame component of the actuation signal to drive the actuator during frames to compensate for the detector motion relative to the scene. The controller computes a re-centering signal (step 62) based on the position of the actuator (e.g. low pass filter of the scene compensation signal) to reset the actuator towards the center of its dynamic range. The re-centering signal constitutes an intentional scene motion signal across the detector that may or may not be required depending on the dynamic range of the actuator. The controller may add (step 64) one or more other inputs of intentional scene motion to the scene motion signal to form the inter-frame component of the actuation signal. The controller performs an inter-frame update (step 66) that effectively switches the inter-frame component into the signal path only in an interval between frames. To facilitate super sampling, the controller may add a sub-pixel dither signal (step 68) to the scene motion by adding a next sub-pixel phase (step 70) to the actuation signal at the next inter-frame update. The controller sums (step 72) the scene compensation signal (intra-frame component) and the intentional scene motion signal (inter-frame component) to form the actuation signal. The controller would typically add a signal, following ongoing motion of the LOS, to the intentional signal applied during the between-frame interval. However, this compensation may equivalently be allied after or at a specified time during the between-frame step. Conversely, the inter-frame component only exists and thus is only applied between frames, not during frames.

To control sub-pixel phase, the controller quantizes the scene motion signal (step 74) to a predetermined quantization step size (or integer multiples thereof). The controller may, for example, quantize the scene motion signal to full-pixel step sizes. The controller subtracts the actuator position, which may be measured or assumed to follow the actuation signal, from the scene compensation signal (step 76) to provide the position of the scene in image space (e.g. on the image detector). The image processing circuit can use the position of the scene in image space to register the images to the pre-determined step size for change detection, super sampling to a high resolution image or summation for example.

Figure 6:
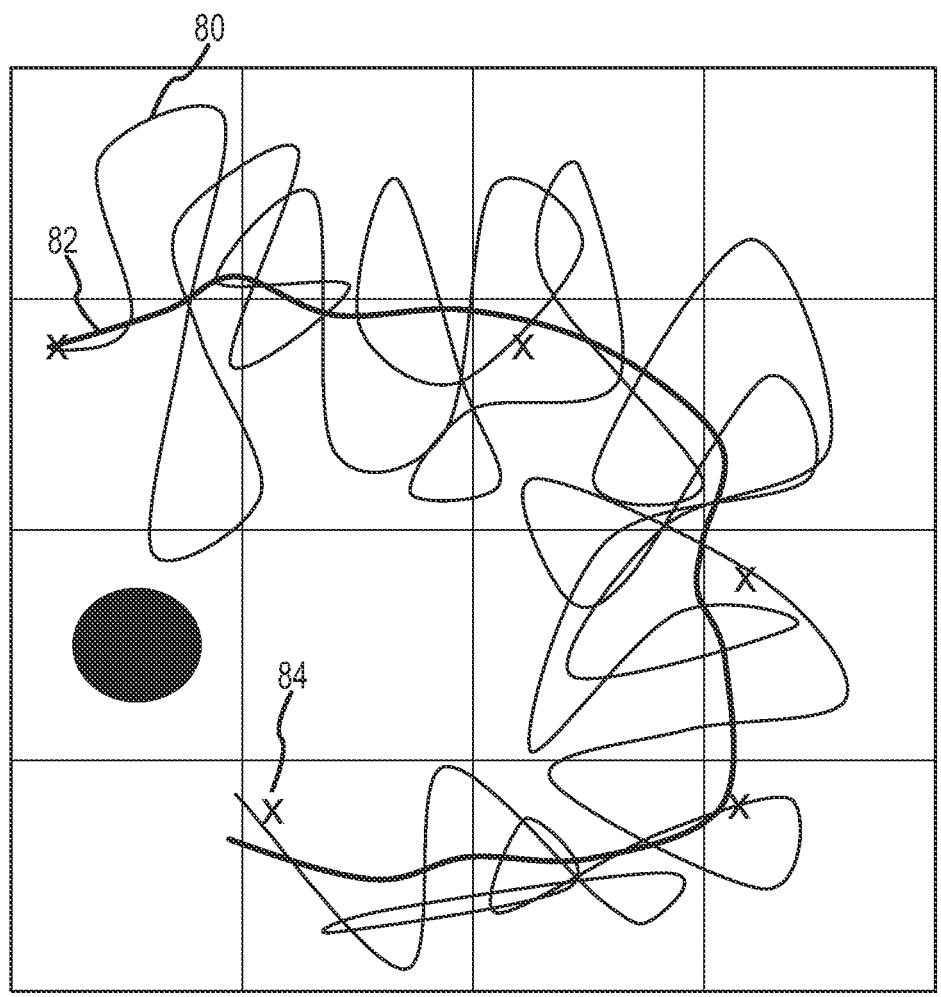
FIG. 6 is a diagram of an actuation signal for control LOS for continuous optical stabilization during frames and discrete intentional scene motion to re-center the actuator between frames without smearing.

FIG. 6 illustrates an embodiment in which the intentional scene motion across the detector is provided to re-center the actuator. The detector motion relative to the scene may have both a high-frequency component ("jitter") 80 and a low-frequency component 82 as shown in scene space. Optical-stabilization will drive the actuator to track and cancel both motion components. If not reset, the actuator will continue to track the low-frequency component 82 creating a "bias" in the actuator. This bias effectively reduces the actuator's dynamic range to correct high-frequency component 80. Therefore, it may be necessary or desirable to re-center the actuator. In conventional imaging systems, the low-frequency component 82 is measured by low-pass filtering the high-frequency component 80 and used to continuously re-center the actuator during the frame while optical stabilization is ongoing. This produces smearing in the image. In accordance with the invention, an estimate of the low-frequency component 82 is calculated, perhaps by low-pass filtering the high-frequency component 80, and used to drive the actuator in a discrete step 84 between frames to re-center the actuator from frame-to-frame without smearing. The motion of the actuator between frames will produce scene motion across the detector in a single discrete step from frame-to-frame. If the actuator reaches the limits of its dynamic range during a frame either the system continues to integrate until the end of the frame and the smearing is tolerated or the integration time is reset and the system moves to the next frame. The estimate may in some cases be quantized to a predetermined step size to control sub-pixel phase. In this example, the estimate is quantized to full pixel step sizes (or integer multiples thereof).

FIGS. 7a and 7b illustrate an embodiment in which the intentional scene motion across the detector is provided to mitigate the effects of dead pixel clumps. As shown in FIG. 7a, the intra-frame optical stabilization stabilizes a scene 90 of a triangle, square and circle on the image detector. As shown, the "square" falls on a dead pixel clump 92 and thus is not detected absent scene motion across the detector. In conventional imaging systems, a designer may specify a rate of scene motion across the detector to mitigate the effects of dead pixel clumps. However, such motion will smear the scene in the detected image within the frame. The greater the rate of motion (desired to better mitigate the effects of dead pixel clumps) the greater the smear. In accordance with the invention, a designer may specify a rate of scene motion 94 from frame-to-frame. The actuator is driven in between frames to move the scene across the detector in a single discrete step 96 from one frame to the next. As shown in FIG. 7b, scene 90 is moved in a discrete step down and to the right in image space from frame-to-frame. The estimate is suitably quantized to a full pixel step size to register and sum the frames to form a sum frame 98.

FIGS. 8a and 8b illustrate an embodiment in which the intentional scene motion across the detector is provided to mitigate the effects of burn-in. Generally, a designer will have knowledge that burn-in may be a problem such as during NUC and will need to add motion across the detector to mitigate. As shown in FIG. 8a, burn-in may be associated with a bright scene 100 moving linearly across the detector. This may create ghost tails 102 that reinforce and create artifacts in the image. In conventional imaging systems, a designer may specify a rate of scene motion and a suitably non-linear path across the detector to mitigate the effects of burn-in; the ghost tails are separated and thus attenuated rather than reinforced. However, such motion will smear the detected scene within the frame, trading ghost tails for scene smearing. The greater the rate of motion, desired to better mitigate the burn-in, the greater the smear. In accordance with the invention, a designer may specify a non-linear scene motion 104 that is represented as single discrete steps 106 from frame-to-frame. The actuator is driven in a discrete step between frames to move the scene across the detector from one frame to the next. This attenuates the ghost tails without causing smearing. The actuator is suitably driven in predetermined step sizes by quantizing the intentional scene motion. The frames are registered and summed to form a sum image 108 without ghost tails or smearing.

FIGS. 9a through 9d illustrate different embodiments in which the intentional scene motion across the detector is used to extend the FOV of the imaging system by driving the actuator in discrete steps between frames.

Figure 9A:
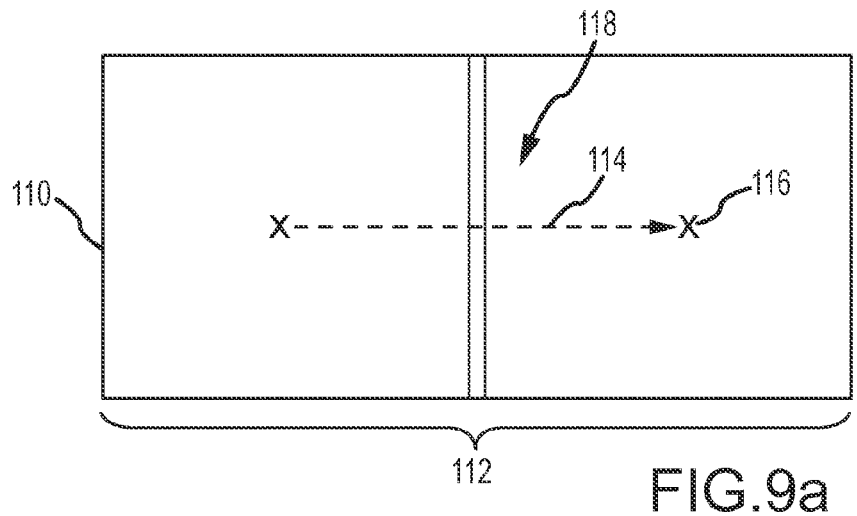

As shown in FIG. 9a, the detector is sized for a FOV 110 and the optics are designed for an extended FOV 112. The intentional scene motion input 114 is specified to step the actuator between frames to produce a single discrete step 116 equal to a full FOV 110 across the detector to tile out extended FOV 112 with an overlap 118 typically large enough to accommodate optical distortion and positioning error, including target position uncertainty (to assure full sampling). Quantizing the scene motion ensures proper registration of the images in overlap 118. This approach is equivalent to a conventional step-stare approach with one significant exception. Since the entire imaging system does not have to be moved, only pieces within the optics, this approach can be much faster and consequently exhibit a much higher photon collection duty factor.

Figure 9B:
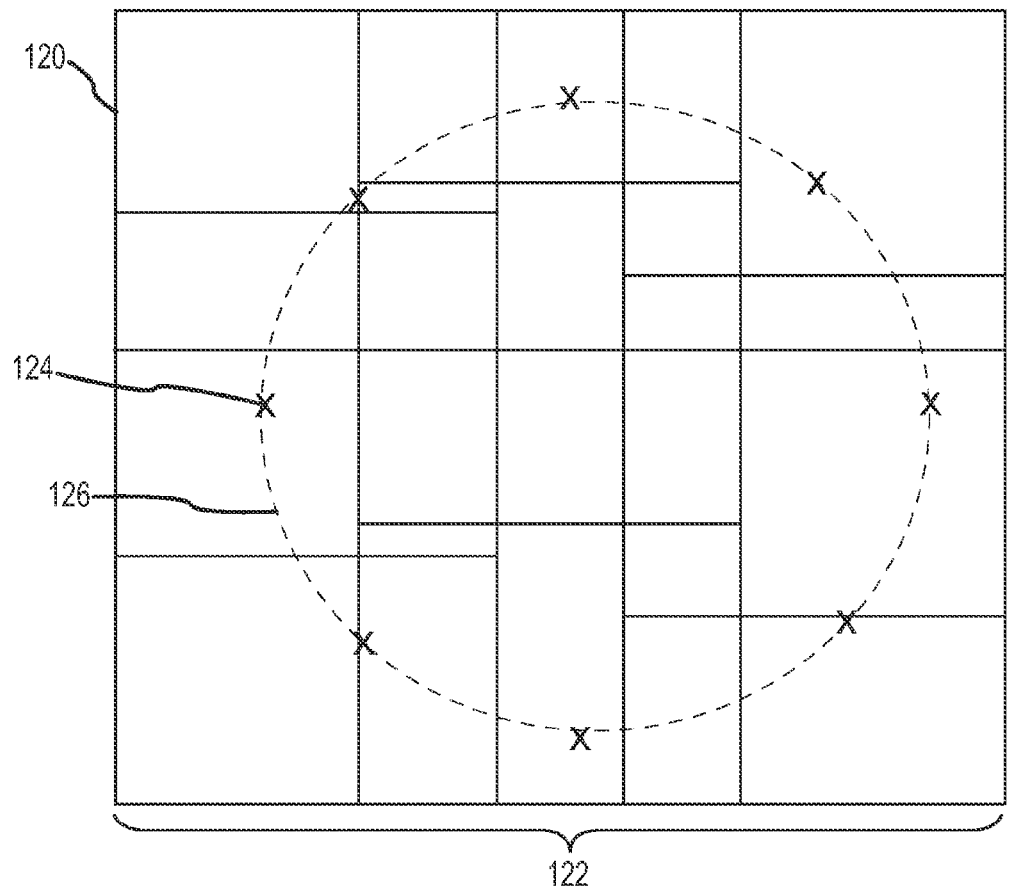

As shown in FIG. 9b, the detector is sized for a FOV 120 and the optics are designed for an extended FOV 122. The intentional scene motion input 124 is specified to step the actuator between frames to produce a single discrete step 124 equal to a partial FOV 120 to tile out extended FOV 122. In this case, the steps 124 between frames are discrete steps that follow a circular scene motion 126 across the image detector. This approach mitigates smear and (optionally) provide frame summing between the overlapping sections. This approach acts like conventional TDI, but without the usual smear during an integration time, so that the SNR is higher for unresolved objects. Unlike conventional TDI, the motion may be in any direction, even following a circular dither.

As shown in FIG. 9c, an image detector 130 is provided with pixels 132 that are under sampled; the blur spot 134 is smaller than the pixel-to-pixel spacing 135. The optics has the desired resolution for the extended FOV. In this example, this approach provides a native FOV for the image detector at the desired level with only half the desired linear resolution. The intentional scene motion input is specified to step the actuator at sub-pixel phases 136 to follow a sub-pixel dither signal 138 (shown here as the resultant sub-pixel steps across the imager and overall scene motion pattern in image space). Super-sampling techniques are then used to recover the desired resolution. There is loss, because of averaging across the active area of the pixel, which is about 2× the size usually desired with consequently high loss at high frequencies from convolution.

As shown in FIG. 9d, the loss associated with the previous approach can be overcome by using a pixel 132 with an intentionally smaller active area (but the same spacing). This trades better response at frequencies near 1 cycle per pixel for worse response at lower frequencies. Interleaving four samples of this detector on a stationary scene provides a near equivalent to 2× higher linear resolution using a detector with four times the number of pixels. Thus, the invention allows an image detector with ¼ of the desired number of pixels to cover the same FOV at the same resolution, trading time for resolution. As an added refinement, focus-axis modulation or other methods may be used to match the blur to the pixel when the higher resolution is not required, preventing aliasing without the time or processing overhead of super-sampling. This prevents aliasing in a native-mode sampling without the additional computation.

Figure 10:
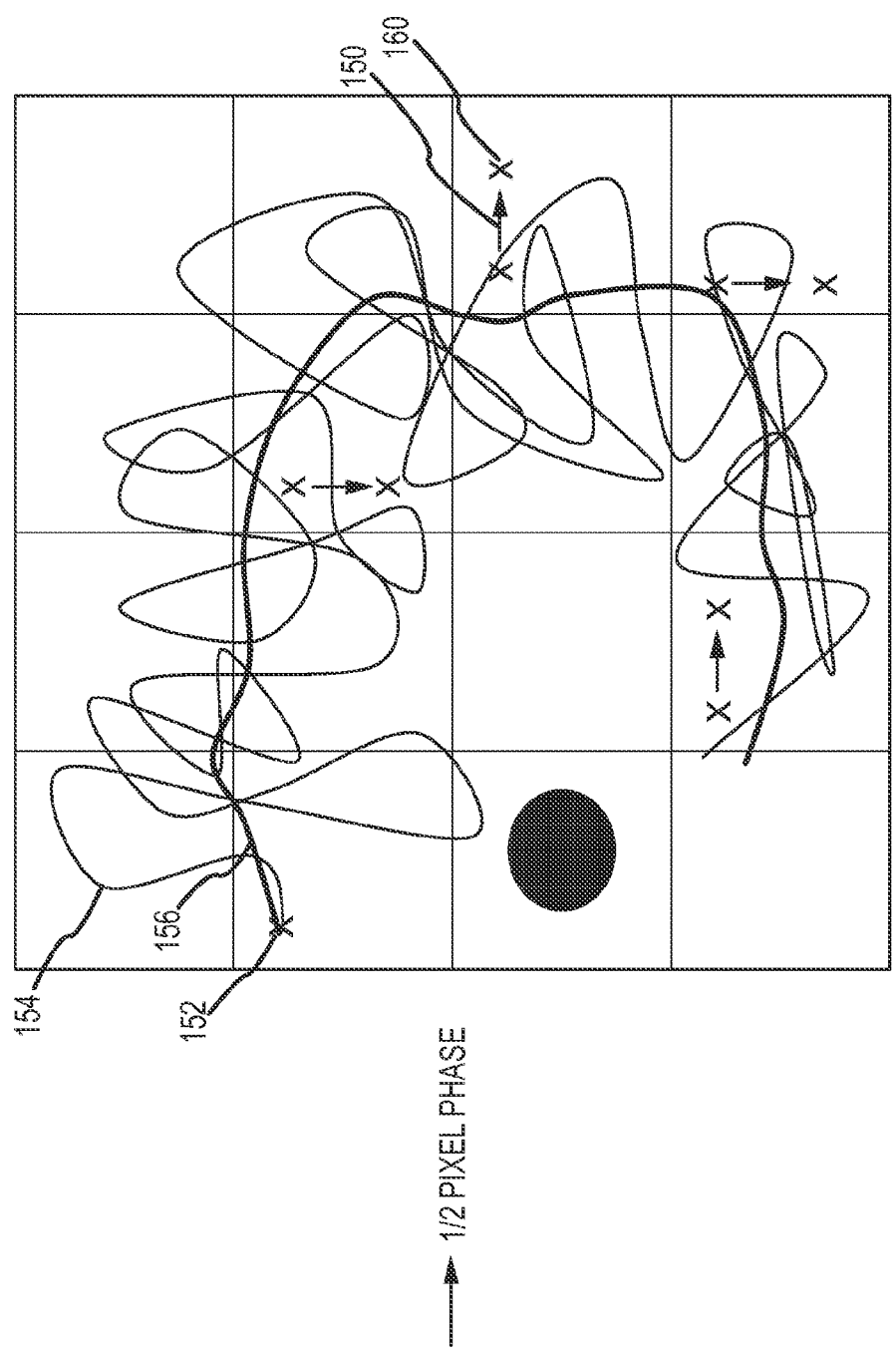
FIG. 10 illustrates super-sampling of the image using inter-frame intentional scene motion.

As shown in FIG. 10, a sub-pixel dither signal is added to the intentional scene motion by adding a sub-pixel phase 150 to each quantized step 152. In this particular example, a scene compensation signal 154 is low-pass filtered to provide the low-frequency component 156 of the actuator position. The low-frequency component 156 is quantized to a full-pixel step size (or integer multiple thereof) 152 to drive (and re-center) the actuator between frames to re-center the actuator frame-to-frame. The next sub-pixel phase 150 in the sub-pixel dither signal is added to the full-pixel step size 152 to provide a step 160 to drive the actuator between frames. The sub-pixel phase component should not on average affect re-centering of the actuator. The magnitude of the sub-pixel phase is typically fixed for a given application (e.g. ½ or ¼ pixel). The direction of the sub-pixel phase may be random (but known) or may be decided based on picking the nearest sub-pixel increment to the current LOS (reducing applied energy) or may be selected using a variety of other approaches. The use of sub-pixel phase 150 to drive the actuator between frames produces single discrete steps across the image detector in sub-pixel increments. Super-sampling techniques are then applied to the sequence of images to recover the desired resolution, 2×, 4× etc. This approach to super-sampling is superior to conventional techniques because it mitigates smear and allows operation simultaneously with large intentional motion across the detector.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of optically-stabilizing an imaging system having a coarse line-of-sight (LOS), said imaging system including an image detector and an actuator configured to capture images of a scene along a fine LOS relative to the coarse LOS in a sequence of frames, wherein said scene is an object of interest in a background, the method comprising:
   responding to a first input of the imaging system's coarse LOS motion and an estimated scene motion, driving the actuator to control the fine LOS to cancel unintentional scene motion across the image detector and stabilize the object of interest on the image detector during image capture in each frame to substantially eliminate smearing in the image caused by detector motion relative to the scene; and
   responding to a second input specifying a desired intentional scene motion of the object of interest across the image detector, driving the actuator in time intervals that lie substantially between frames to control the fine LOS to provide the desired intentional scene motion to move the object of interest across the image detector in a discrete step from frame-to-frame, decoupling the intentional scene motion across the image detector from scene capture during frames and substantially eliminating smearing in the image caused by the intentional scene motion.

2. The method of claim 1, wherein the actuator is driven continuously to cancel scene motion across the image detector and is driven in a single discrete step between frames to provide the intentional scene motion in the discrete step across the image detector from frame-to-frame.

3. A method of optically-stabilizing an imaging system, said imaging system including an image detector configured to capture images of a scene along a line-of-sight (LOS) in a sequence of frames, the method comprising:
   responding to unintentional or intentional detector motion relative to the scene during each frame, driving an actuator during the frame to control the LOS to cancel scene motion across the image detector and substantially eliminate smearing in the image caused by detector motion relative to the scene; and
   responding to an input specifying a desired intentional scene motion across the image detector, quantizing the input to integer multiples of a pre-determined step size and driving the actuator between frames with the quantized input to control the LOS and provide the intentional scene motion in the discrete step across the detector in discrete step sizes equal to integer multiples of the pre-determined step size from frame-to-frame, decoupling the intentional scene motion across the image detector from scene capture during frames and substantially eliminate smearing in the image caused by the intentional scene motion.

4. The method of claim 3, wherein the pre-determined step size represents a single full pixel of the image.

5. The method of claim 3, further comprising:
   responding to the quantized input, registering the images from the sequence of frames and summing the registered images to produce a sum image at a resolution determined by the pre-determined step-size of the quantization.

6. The method of claim 1, wherein said image detector forms the image over an integration time during the frame, wherein at the end of each frame the image is read out and the integration time is reset during a reset period, said actuator being driven between frames in the reset period to provide the intentional scene motion across the image detector while the detector is not integrating.

7. The method of claim 1, wherein said image detector forms the image from photons detected over an integration time during the frame, said actuator being driven between frames to provide the intentional scene motion across the image detector during a reduced interval between frames while the detector is integrating, wherein the reduced interval is sufficiently short that the contribution of photons is minimal.

8. The method of claim 7, wherein the multi-column detector comprises a TDI CCD or an orthogonal transform CCD.

9. The method of claim 1, wherein the actuator has a limited dynamic range of motion, the second input comprising a re-centering signal to reset the actuator towards the center of its dynamic range between frames.

10. A method of optically-stabilizing an imaging system, said imaging system including an image detector configured to capture images of a scene along a line-of-sight (LOS) in a sequence of frames, the method comprising:
   responding to unintentional or intentional detector motion relative to the scene during each frame, driving an actuator during the frame to control the LOS to cancel scene motion across the image detector and substantially eliminate smearing in the image caused by detector motion relative to the scene; and
   responding to an input specifying a desired intentional scene motion across the image detector, driving the actuator between frames to control the LOS to provide intentional scene motion in a discrete step across the image detector from frame-to-frame, decoupling the intentional scene motion across the image detector from scene capture during frames and substantially eliminate smearing in the image caused by the intentional scene motion, said input comprising a signal that increases a rate of scene motion across the image detector to mitigate at least one of dead pixel clumps in the image detector, NUC of the image detector or burn-in of the image detector.

11. A method of optically-stabilizing an imaging system, said imaging system including an image detector configured to capture images of a scene along a line-of-sight (LOS) in a sequence of frames, the method comprising:
responding to unintentional or intentional detector motion relative to the scene during each frame, driving an actuator during the frame to control the LOS to cancel scene motion across the image detector and to substantially eliminate smearing in the image caused by detector motion relative to the scene; and
responding to an input specifying a desired intentional scene motion across the image detector, driving the actuator between frames to control the LOS to provide intentional scene motion in a discrete step across the image detector from frame-to-frame, decoupling the intentional scene motion across the image detector from scene capture during frames and substantially eliminate smearing in the image caused by the intentional scene motion, wherein the input comprises a dither signal for sub-pixel motion.

12. The method of claim 1, wherein the second input comprises a signal in response to pointing errors of the coarse LOS to drive the actuator to control the fine LOS or stabilize the coarse LOS motion.

13. The method of claim 1, wherein the image detector has a field-of-view (FOV) and the imaging system includes an optical system that images the scene over a larger extended FOV, said second input comprises a signal to drive the actuator between frames to move the detector FOV in discrete steps from frame-to-frame to form the extended FOV over multiple frames.

14. A method of optically-stabilizing an imaging system, said imaging system including an optical system that images a scene over a field-of-view (FOV) at a specified resolution and an image detector configured to capture images of a scene along a line-of-sight (LOS) in a sequence of frames, said image detector is under sampled and exhibits less than the specified resolution over the same FOV, the method comprising:
responding to unintentional or intentional detector motion relative to the scene during each frame, driving an actuator during the frame to control the LOS to cancel scene motion across the image detector and to substantially eliminate smearing in the image caused by detector motion relative to the scene; and
responding to an input specifying a desired intentional scene motion across the image detector, driving the actuator between frames to control the LOS to provide intentional scene motion in a discrete step across the image detector from frame-to-frame, decoupling the intentional scene motion across the image detector from scene capture during frames and substantially eliminate smearing in the image caused by the intentional scene motion, said input comprises a signal to drive the actuator between frames at sub-pixel phases to move the FOV in said discrete step approximately equal to the next sub-pixel phase to recover the specified resolution.

15. The method of claim 14, wherein the actuator is driven to enlarge an effective blur whereby less super sampling is required to avoid aliasing in exchange for some loss of resolution.

16. A method of optically-stabilizing an imaging system, said imaging system including an image detector configured to capture digital images of a scene along a line-of-sight (LOS) in a sequence of frames, the method comprising:
responding to unintentional or intentional image detector motion relative to the scene during each frame, continuously driving an actuator during the frame to control the LOS to cancel scene motion across the image detector to substantially eliminate smearing in the digital image caused by relative detector motion;
responding to an input specifying a desired intentional scene motion across the image detector, quantizing the input to an integer multiple of a pre-determined step size and driving the actuator between frames with the quantized input in a single discrete step to control the LOS frames to provide intentional scene motion in a discrete step across the image detector frame-to-frame decoupling the intentional scene motion across the image detector from scene capture during frames to substantially eliminate smearing in the digital image caused by the intentional scene motion and to control sub-pixel phase frame-to-frame; and
responding to the quantized input, registering the digital images from the sequence of frames and summing the registered digital images to produce a sum image at a resolution determined by the pre-determined step size of the quantization.

17. An optically-stabilized imaging system, comprising:
an optical system for focusing an image of a scene within a field-of view (FOV) along a coarse line-of-sight (LOS) onto a common image plane, wherein said scene is an object of interest in a background;
an image detector substantially aligned with the common image plane to capture images in a sequence of frames;
an actuator responsive to an actuation signal to move one or more optical elements of the optical system or the image detector to control a fine LOS relative to the coarse LOS;
a motion sensor configured to measure coarse LOS motion; and
a controller configured to provide the actuation signal including (a) an intra-frame component responsive to a first input of the coarse LOS motion and an estimated scene motion to drive the actuator to control the fine LOS to cancel scene motion across the image detector and stabilize the object of interest on the image detector during image capture in each frame to substantially eliminate smearing in the image caused by detector motion relative to the scene and (b) an inter-frame component responsive to a second input specifying a desired intentional scene motion of the object of interest across the image detector to drive the actuator in time intervals that lie substantially between frames to move the object of interest across the image detector in a discrete step from frame-to-frame, decoupling the intentional scene motion across the image detector from scene capture during frames and substantially eliminating smearing in the image caused by the intentional scene motion.

18. The system of claim 17, wherein the actuator is driven continuously during the frame to cancel scene motion across the image detector and is driven in a single discrete step between frames to provide intentional scene motion in the discrete step across the image detector.

19. The system of claim 17, wherein the controller quantizes the input to integer multiples of a pre-determined step size to drive the actuator between frames.

20. The system of claim 19, further comprising:
an imaging processing circuit responsive to the quantized input to register and sum the images from the sequence of frames to produce a sum image at a resolution determined by the pre-determined step-size of the quantization.

21. The system of claim 17, said input comprising a signal that increases the rate of scene motion across the image detector to mitigate at least one of dead pixel clumps in the image detector, NUC of the image detector or burn-in of the image detector.

22. The system of claim 17, wherein the input comprises a dither signal for sub-pixel motion.

23. A method of optically-stabilizing an imaging system, said imaging system including an image detector configured to capture images of a scene along a line-of-sight (LOS) in a sequence of frames, wherein said scene is an object of interest in a background, the method comprising:
   driving an actuator to control the LOS to cancel unintentional scene motion across the image detector and stabilize the object of interest on the image detector during image capture in each frame; and
   driving the actuator in time intervals that lie substantially between frames to control the LOS to move the object of interest with an intentional scene motion across the image detector in a discrete step from frame-to-frame to substantially decouple the intentional scene motion of the object of interest across the image detector from image capture during frames.

* * * * *